Oct. 9, 1928.

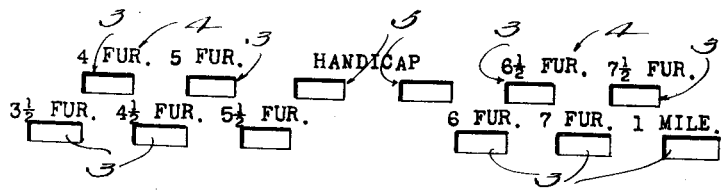

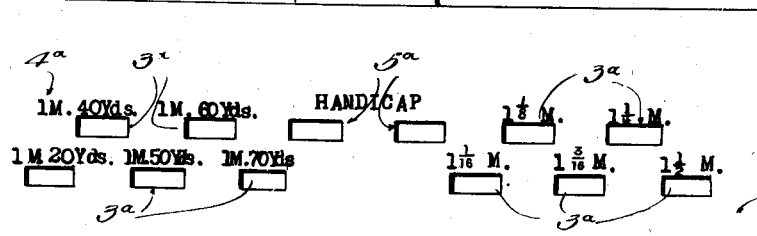

W. B. BURKE 1,686,843

HANDICAPPING DEVICE

Original Filed April 16, 1925    4 Sheets-Sheet 3

Oct. 9, 1928.
W. B. BURKE
1,686,843
HANDICAPPING DEVICE
Original Filed April 16, 1925  4 Sheets-Sheet 4
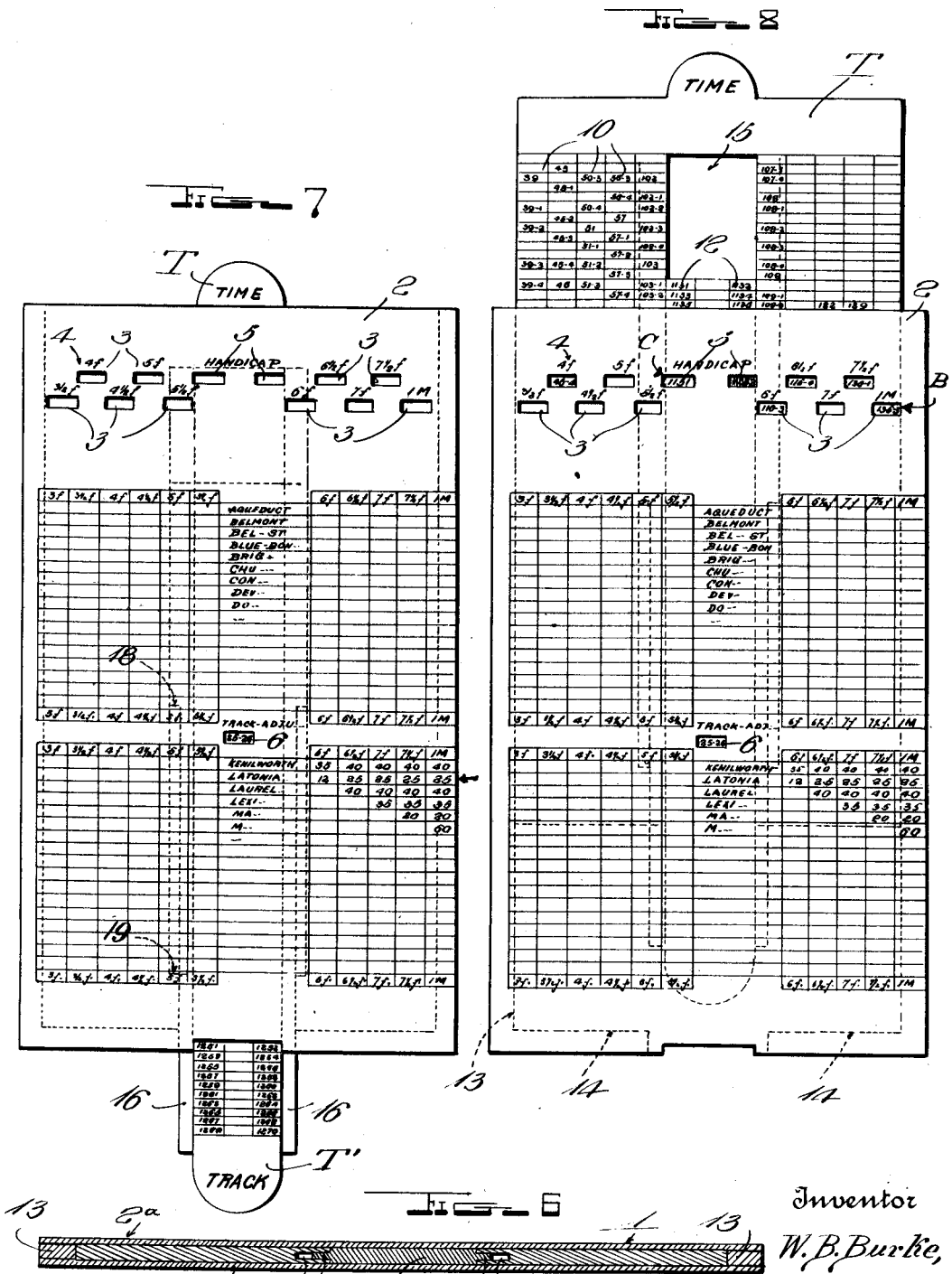
Inventor
W. B. Burke,
By H. B. Wilson & Co.
Attorneys
Witness Patented Oct. 9, 1928.

1,686,843

UNITED STATES PATENT OFFICE.

WALTER B. BURKE, OF CHICAGO, ILLINOIS, ASSIGNOR TO THE DOMINO SYSTEM CO., OF CHICAGO, ILLINOIS, A CORPORATION OF ILLINOIS.

HANDICAPPING DEVICE.

Application filed April 16, 1925, Serial No. 23,615. Renewed January 17, 1928.

My invention aims to provide a new and improved device usable to advantage by daily newspapers and other publications in the formulation of items relating to horse racing, motor-car or boat racing, athletic racing, etc.; by the secretaries of horse racing or other racing associations as a guide in allotting weights or arranging handicaps, in which it is necessary to consider past performances on different courses, etc.; by owners of race horses, racing machines, racing boats, etc., as a guide in placing entries in proper races, by comparing the records of their proposed entries with others, taking into consideration the courses over which the previous races were run, the distances, the weights carried, etc.; by State and county fair associations and others in placing only such contestants in any kind of a race, as to give equal chances to all, etc.

With the foregoing in view, the invention resides in the novel subject matter hereinafter described and claimed, the description being supplemented by the accompanying drawings.

Figure 1 is a front elevation of a race horse handicapping device constructed in accordance with my invention.

Figure 2 is a rear elevation.

Figure 3 is a front elevation of the slidably connected time and track slides which are mounted within a sheath, whose front and rear sides are disclosed in Figs. 1 and 2.

Figure 4 is a side elevation of the track slide disconnected from the time slide.

Figure 5 is a detail sectional view on line 5—5 of Fig. 4.

Figure 6 is a horizontal sectional view through the device.

Figures 7 and 8 are small front elevations showing different steps in using the device.

The present disclosure of the invention is directed to a device for handicapping race horses, but it will be obvious from the foregoing that the invention is not restricted to this field of use and that regardless of its sphere of use, the device may be employed to give licit information which may be put to legitimate use.

In the drawings above briefly described, the numeral 1 designates a flat sheath whose obverse side wall 2 is formed with a plurality of openings 3 having distance designations 4 ranging from three and one-half furlongs to one mile, while the reverse side wall 2ª of said sheath is formed with similar openings 3ª having distance designations 4ª from one mile and twenty yards, to one and one-half miles. The obverse wall 2 is also formed with two openings 5 identified by the word "Handicap," and with another opening 6 to which the words "Track adjustment" are assigned. Similar openings, similarly identified are provided at 5ª and 6ª in the reverse wall 2ª of the sheath.

A vertical column 7 of track names is provided on the obverse face 2 of the sheath 1, and I also provide this face with vertical columns of numbers 8 which are termed "track factors." These columns are given distinct designations 9 representing distances and ranging from three furlongs to one mile, corresponding substantially to the distance designations 4 of the openings 3. In these columns 8, in horizontal alinement with any track name of the column 7, are the track factors relating to that particular track, for distances from three furlongs to one mile. Most of these factors are printed in one color (preferably black), but others are of a different color (usually red) as represented by the vertical shading.

The characters 7ª, 8ª and 9ª designate data on the reverse side 2ª of the sheath 1, said data corresponding to that above identified by the numerals 7, 8, and 9, but relating to longer distances (from one mile and twenty yards, to one and one-half miles).

The track factors 8 and 8ª are merely symbols representing the comparative speeds of the numerous tracks for different distances. These tracks are rated and assigned numbers corresponding to their ratings, the fastest tracks being given the smaller numbers. Consider the five furlong column, for instance, of the factors 8, and we find that for this distance (five furlongs) Saratoga is the fastest track with a rating or track factor of 10; Belmont ranks second with a track factor or rating of twelve; Maple Heights is third with a factor of twenty, etc., Prince George (Bowie) being the slowest, with a rating or track factor of sixty. These track factors are compiled from the track records for the different distances of each track, taking into consideration the class of horse making the record, as well as the shapes and contours of the different tracks. On the tracks located in or near large cities, such as New York, Baltimore, Louisville, etc., a better class of horses will be found and the track records of such tracks must be treated accordingly, somewhat differently from the records made on the smaller tracks, such as Omaha, Reno, etc. All of these factors have been given due consideration in compiling the track factors 8 and 8ª herein disclosed. These figures are absolutely arbitrary and the inventor's results, obtained in the manner above set forth. As new tracks are built from time to time, they will of course have to be rated in comparison with the other tracks in operation and a comparative speed figure or track factor given to each new track.

Slidable vertically in the sheath 1, is a "time slide" T, which is distinctly identified in the device by the word "Time". Slidably carried by this time slide for vertical movement, is a "track slide" T'. The slide T is provided with vertical columns 10 of time-representing numbers. These columns 10 are so positioned as to render their numbers visible through the openings 3. Some of the time numbers of the columns 10 are printed in one color and some in a distinguishing color, red and black being preferably used. The vertical shading, represents the red numbers. This is done to reduce the size of the table on the time slide T, for if but one color were used, this table would necessarily be twice as large. The time figures in the column 10 are the result of taking the average comparative speed for the different distances on all of the tracks for which records are available. It is obvious that the rate of speed will decrease as the distance increases. For instance, if a horse will run half a mile in forty-eight seconds, it would not follow that it would run a mile in twice the time, but records show that the time would be about one minute and thirty-nine seconds. This time factor is taken care of, in the location of the figures on the table and their relation to the "handicap figures" hereinafter described. The time figures of the columns 10 are the average relative time figures for all tracks, but each track will vary in speed when compared with another track, and the speed for each track for different distances will vary. This variation is caused by the differences in shapes and constructions of the tracks. Many of them have "chutes" out of which the three-fourth mile races are run, which gives them a race of that distance with but one turn, and it is reasonable to suppose that a race over this track for three-fourths of a mile would be run faster than over a track where the three-fourths mile post is on a turn. This factor is taken care of with the figures 8 on the front of the sheath, which form the key for setting the track slide T', and which automatically brings all tracks and all distances on a par with each other The obverse face of the track slide T', is provided with a central vertical column 11 containing "track adjustment numbers" which include the same numbers as the track factors 8, the figures or numbers of said column 11 being visible through the opening 6. The obverse face of the track slide T' is also provided with two columns 12 of "handicap numbers", one column being of a distinct color from the other, red and black being preferably used. Whenever a red number shows up in one of the distance openings 3, the red figure then appearing at one of the handicap openings 5, should be read, instead of the black number appearing at the other of said openings 5.

The reverse sides of the slides T and T' are provided with columns similar to the columns 10, 11 and 12, for co-action with the openings 3ª, 6ª and 5ª, as will be readily understood without further illustration.

The device may be used in the following manner, to estimate the order in which the horses entered in a race should run, judging from past performances. For illustrative purposes, we will consider that the invention was used in connection with the third race at Latonia, July 1, 1924, in which the following horses were entered, bearing the weights which follow their names:—Revenue Agent 114; Bourbon Boy 109; United Verde 113; Delectable 99, and Margaret Windsor 100. We must now first consider Revenue Agent's past performances which may readily be found in any one of a number of well known past performance sheets. We find (first for example) that at Latonia, this horse ran one mile in one minute, thirty-six and three-fifths seconds (commonly written 136 3-5), carrying 107 pounds. With this information, we find the track factor in the one mile column (the distance run) opposite Latonia, (the track on which the race was run). This track factor, we find to be twenty-five as distinctly pointed out by the arrow in Fig. 7. This track factor (25) is the key to operating the entire device and we first adjust the slide T' (marked Track) until the "track adjustment" number 25 of the column 11, appears in the track adjustment opening 6, the time slide T being then forced downwardly to the maximum extent within the sheath 1. Figure 7 shows the track slide T' adjusted in this manner. We now pull upwardly upon the time slide T which moves the track slide T' bodily with it, and we adjust said slide T, until 136-3, appears in the opening 3 designated 1M. (meaning one mile). This time, it will be remembered (136 3-5) is the time in which the race being considered was run. It will be found that this time shows up in black in the opening 3, as indicated by the arrow B in Fig. 8. At the same time, numbers of the columns 12 are visible in the handicap openings 5, but as the number appearing in the opening 3 is in black, we read only the black number appearing in one of the openings 5, which number we find to be 1151. If the race to be run permitted the horse (Revenue Agent) to carry the same weight as that in the previously run race under consideration (107 pounds), we would jot down 1151, the handicap number just obtained, indicated by the arrow C in Fig. 8. It is to be remembered however that in the race to be run, Revenue Agent must carry 114 pounds, a difference of seven pounds. Consequently, to the handicap number 1151, we must add four points for these seven pounds additional weight, (one point for each two pounds or fraction thereof). This gives a handicap number of 1155 for Revenue Agent in the race just considered. By manipulating the device in a similar manner, other handicap numbers may be obtained for a number of other races in which Revenue Agent has run, and the smallest of the handicap numbers thus obtained, is written down as the final handicap number, or rating. Each of the other horses to run in the race is by a similar method, alloted a handicap number, and the smallest of the numbers is given first choice to win the race. By operating my device in connection with the particular Latonia race above referred to (July 1, 1924), I derived the following handicap numbers: Revenue Agent 1155; United Verde 1163; Bourbon Boy 1174; Delectable 1175, and Margaret Windsor 1182. Thus, Revenue Agent having the smallest handicap number was picked to win the race and Margaret Windsor having the largest handicap number, was picked to run last, the others ranging according to their numbers. In the particular race in question, the horses actually ran in the exact order estimated by the device, showing its accuracy conclusively.

As to the general construction and operation of the invention, it will be readily understood from the foregoing. Considering specific structure, while that may be varied, the construction shown is preferable. The sheath 1, comprises the two opposed sides 2 and 2ª secured against opposite sides of parallel strips 13 which form edge walls for said sheath, said strips having inward extensions 14 forming stops which abut and limit the downward movement of the time slide T. The lower end of the track slide T' is movable between the inner ends of these stops. This time slide comprises a straight elongated strip of suitable material slidably received in a longitudinal slot 15 formed in the time slide T, said slot opening through the lower end of said slide T. Opposite edges of this track slide are provided with longitudinal fins 16 which are received in narrow grooves 17 formed in the parallel edge walls of the slot 15, and coacting shoulders 18 and 19 may be provided on the two slides to prevent withdrawal of the one from the other. Quite an amount of friction exists between the two slides, so that after first adjusting the track slide T', it will remain in fixed relation with the slide T, while the latter is being adjusted.

Excellent results have been obtained from the details disclosed and they are therefore preferably followed. However, within the scope of the invention as claimed, numerous variations may be made, and it will be understood that a device constructed in accordance with this invention, employing the sheath and the two slides, could well be used for purposes other than handicapping horse races. I do not therefore wish to be limited except by the manner of claiming the invention.

I claim:

1. A handicapping device comprising a time slide having time figures, a track slide carried by said time slide, said track slide being adjustable with respect to said time slide and thereafter movable bodily with the latter, handicap figures on said track slide, a wall in front of said slides having distance openings for disclosing the time figures and a handicap opening for disclosing the handicap figures, and indicating means permitting setting of the track slide with respect to the time slide.

2. A handicapping device comprising a time slide having time figures, a track slide carried by said time slide, said track slide being adjustable with respect to said time slide and thereafter movable bodily with the latter, handicap figures on said track slide, track adjustment figures also on said track slide, and a wall in front of said slides having distance openings for disclosing the time figures, a track adjustment opening for disclosing the track adjustment figures, and a handicap opening for disclosing the handicap figures.

3. A device of the character described, comprising a sheath having a pair of transversely alined spaced openings arranged centrally near one end, said sheath also having a third opening spaced inwardly from and longitudinally alined with the space between said pair of openings and additional openings transversely spaced from those first named, a slide in said sheath having columns of numerals longitudinally alined with said additional openings and having a central longitudinal slot, a second slide disposed in the slot and having three columns of numerals parallel with the other columns, said second slide being movable thereon to register a numeral of the central column with said third opening to set for view through the third opening a known numeral, both slides then being movable to register a known numeral on the first slide with one of said additional openings and simultaneously register a numeral in one of the side columns on the second slide with one of the first named pair of openings to expose the desired numeral.

4. A handicapping device comprising a rectangular time slide having parallel rows of time figures, a track slide carried by said time slide and disposed in parallel relation with its columns of figures, said track slide being adjustable with respect to said time slide and thereafter movable bodily therewith, a column of handicap figures on said track slide parallel with the time number columns of the time slide, a column of track adjustment figures also on said track slide parallel with the other columns of figures, a sheath in which the two slides are mounted, said sheath having distance openings through which the distance figures of the time slide may be viewed, having a handicap opening through which the handicap figures of the track slide may be seen, and having also a track adjustment opening through which the track adjustment figures of said track slide are visible, a column of race track names on said sheath, and columns of track factors also on the sheath in parallel relation with said column of track names, said track factor columns having distance designations corresponding substantially to similar designations for the aforesaid distance openings, said track factors corresponding substantially to said track adjustment figures and being disposed in line with the race track names.

In testimony whereof I have hereunto affixed my signature.

WALTER B. BURKE.